United States Patent [19]

Jones

[11] Patent Number: 4,525,312

[45] Date of Patent: Jun. 25, 1985

[54] OPTICAL FIBRE REINSTATEMENT

[75] Inventor: Stephen R. Jones, St. Mary Bourne, England

[73] Assignee: Standard Telephones and Cables plc, London, England

[21] Appl. No.: 554,805

[22] Filed: Nov. 23, 1983

[30] Foreign Application Priority Data

Nov. 24, 1982 [GB] United Kingdom ............... 8233469

[51] Int. Cl.³ .................... B29D 11/00; C03C 25/02
[52] U.S. Cl. .................... 264/1.5; 264/254; 65/3.11; 427/163; 427/169
[58] Field of Search .............. 427/163, 169; 264/1.5, 264/9, 36, 254, 263, 272.15; 249/97; 156/48, 94; 65/3.11, 3.4, 3.41, 3.43

[56] References Cited

U.S. PATENT DOCUMENTS 4,173,392 11/1979 Ekinaka et al. ............... 350/96.26
4,410,561 10/1983 Hart, Jr. ............... 427/54.1

Primary Examiner—Norman Morgenstern
Assistant Examiner—Kenneth Jaconetty
Attorney, Agent, or Firm—Kerkam, Stowell, Kondracki & Clarke

[57] ABSTRACT

The primary coating (2) of an optical fibre element is reinstated over a fused joint between two silica fibre elements (3) by a casting process. The jointed silica fibre elements are arranged in a groove (8) of a mould (9, 10, 11) and liquid uncured primary coating material placed into the groove, the groove ends being blocked by the existing primary coatings (2) on the fibre elements (3). The coating material in the groove is cured by, for example, heating the mould. Secondary coating material (1) may be injection moulded using a two-part mould to reinstate the secondary coating over the cast primary coating.

4 Claims, 3 Drawing Figures

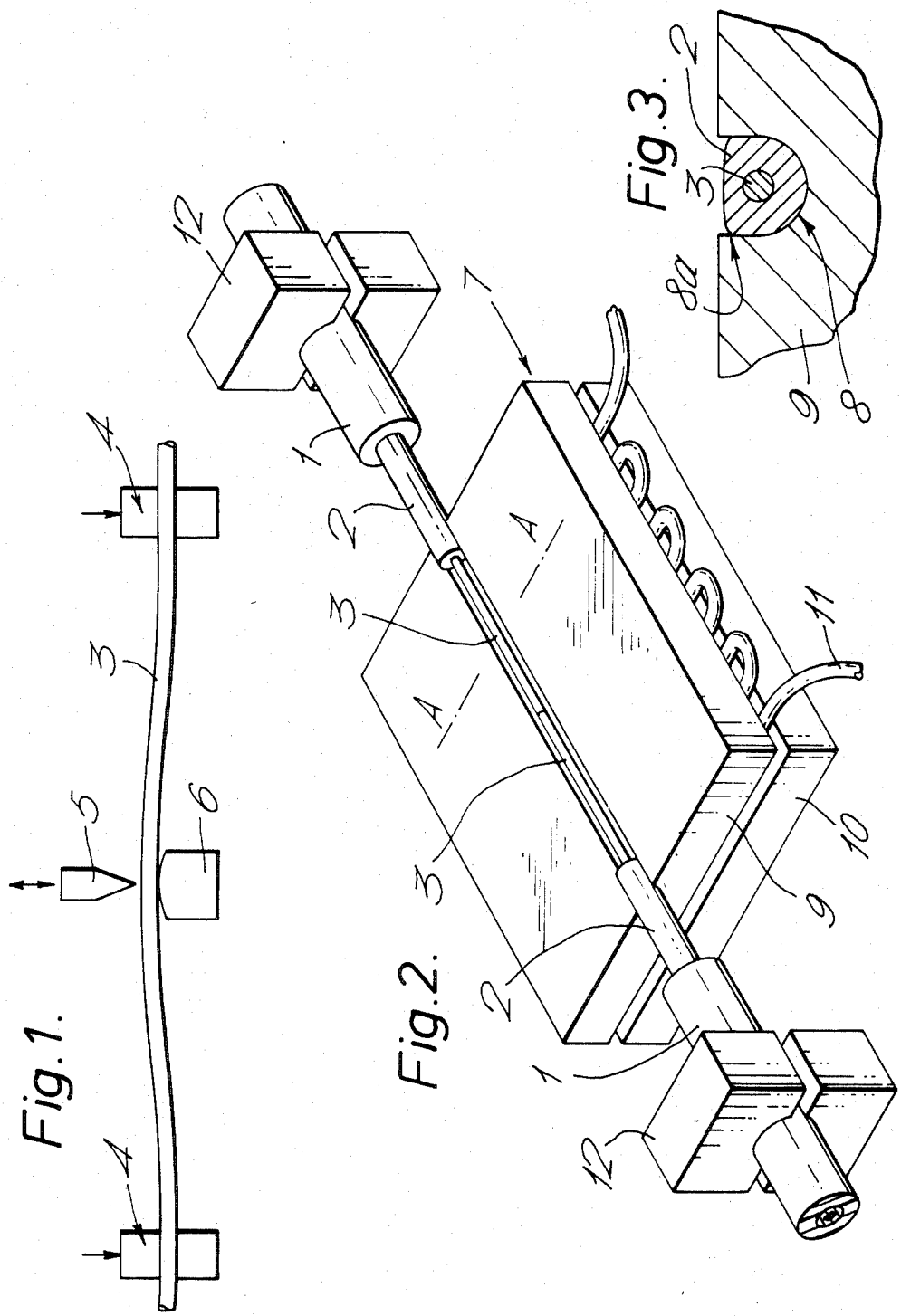

OPTICAL FIBRE REINSTATEMENT

This invention relates to optical fibre reinstatement, and in particular to the jointing of the silica fibre members of two secondary coated optical fibres and the reinstatement of the primary and secondary coatings over the joint region.

According to one aspect of the present invention there is provided a method of providing a coating on a length of an optical fibre including the steps of arranging the length of optical fibre to be coated to extend in a groove of a mould member, placing a quantity of uncured liquid coating material in the groove whereby the length of optical fibre to be coated is immersed in the coating material, and curing the coating material.

According to another aspect of the present invention there is provided a method of jointing two optical fibre elements each including a silica fibre having a coating thereon, including the steps of removing the coating for a predetermined length adjacent each element end, cleaving each of the silica fibres such that their end faces are perpendicular to their longitudinal axes and substantially flat, fusing the silica fibre end faces together and providing a reinstatement coating over the exposed and joined silica fibres by arranging the exposed jointed silica fibres in a groove of a mould member, placing a quantity of uncured liquid coating material in the groove whereby to cover the exposed silica fibres and curing the coating material.

Embodiments of the present invention will now be described with reference to the accompanying drawings, in which:

FIG. 1 shows, somewhat schematically, an arrangement for cleaving silica fibres accurately;

FIG. 2 shows a view of an arrangement for reinstating the primary coating, and

FIG. 3 shows, on an enlarged scale, a section through the mould, fibre and primary coating taken along line A—A of FIG. 2.

Prior to jointing two secondary coated optical fibres the ends thereof must be prepared. The secondary coating 1 (FIG. 2), which may comprise a polyamide such as Nylon, is removed from a length of each fibre end, typically 9 mm, by, for example, wire strippers. A portion of the thus exposed primary coating 2, which is generally an elastomer, for example a silicone rosin such as "Sylgard" (Registered Trade Mark), is then stripped for a distance, typically 4 mm, from each fibre end, by, for example, employing a knotted loop as described in our co-pending British Application No. 8035349 (U.S. Ser. No. 238,870, filed Feb. 27, 1981) A. J. Robertson 2–1x).

In order to accurately joint the ends of two silica glass fibres 3 it is desirable that their end faces should be relatively flat and that the planes of their end faces should be perpendicular to their respective longitudinal axes. This may be achieved by clamping each fibre end in turn between a pair of longitudinally spaced clamps 4 (FIG. 1) such that the fibre 3 extends between two elements comprising a fibre cleaver. The elements comprised a pivoted axe member 5, which is hydraulically damped, and co-operating arbor 6. The axe member 5 serves to nick the surface of the fibre 3, when brought down onto the fibre, such that when the fibre is substantially tensioned to a particular value the fibre breaks at the nick and a smooth end perpendicular to the fibre axis is achieved.

The two fibre ends thus prepared then have their silica fibre end faces aligned and fused together. This may be achieved by the method and apparatus disclosed in our co-pending Application Ser. No. 467,534, filed Feb. 17, 1983 (R. Biedka 2). The apparatus includes two clamping arrangements, one such that the end faces to be joined face one another and one to precisely locate the fibres along a common axis with their end faces in abutment before their ends are fused together as a result of heating the glass of the fibres by passing current between two spaced electrodes, the end faces being arranged in the gap between the electrodes.

The primary coating must next be reinstated to extend over the silica fibre joint between the ends of the portions of the primary coating 2 exposed by the removal of the secondary coating 1. This may be achieved by casting a quantity of the primary coating material about the exposed silica fibres. FIG. 2 shows a suitable casting arrangement. It comprises a heatable mould 7 having a groove 8, which is substantially semi-circularly sectioned and may have straight wall portions 8a (FIG. 3), extending across an upper surface of a first mould element 9. The width of the groove corresponds to the external diameter of the primary coated fibre. Between the first mould element 9 and a second mould element 10 is arranged a resistive heating element 11. At least the first mould element is preferably manufactured from a non-stick material, such as TEFLON (Registered Trade Mark) in order to ensure ease of release of the cast primary coating material therefrom. Adjacent each end of the groove 8 is an arrangement shown schematically at 12 for clamping the fibres whilst aligning and tensioning the jointed silica fibre portion in the groove 8 and during primary coating reinstatement. The ends of the primary coating 2 remaining on the fibres are arranged within the length of the groove 8 whereby to effectively close the ends thereof. The mould 7 is heatable by means of the resistive heating element 11. A quantity of uncured liquid primary coating material is placed in the groove to completely cover the fibre. In view of the small sizes involved only a drop or so of coating material is required and this disperses to fill the groove. A cross-section of FIG. 3 shows the fibre 3 in the groove 8 and surrounded by primary coating material 2. The supply to the heating element 11 is switched on to heat the mould to approximately 200° C. This temperature is maintained for approximately 5 minutes, at the end of which time coating material in the groove is cured. The mould current supply is switched off and once cooled the fibre is removed from the mould groove, which is shaped and formed in such a material as to facilitate removal.

The secondary coating 1 is then reinstated over the exposed primary coating between the ends of the existing secondary coatings. This may be achieved by injection moulding secondary coating material therearound by employing a suitable two-part mould (longitudinally-split) clamped in position between the secondary coated fibre ends. The fact that the casting process results in reinstated primary coating of non-uniform thickness around the optical fibres is of no consequence, since the use of the two-part injection mould with predetermined cavity dimensions for the secondary coating reinstatement ensures the joint after injection is of the required shape and dimensions.

Whereas heat curing of the primary coating material is described above, it is to be understood that in dependence on the primary coating material employed an alternative curing process may be required, for example UV irradiation.

I claim:

1. A method of providing reinstatement primary and secondary coatings on a length of uncoated optical fibre, said length extending between two portions of the optical fibre having existing primary and secondary coatings, the method including the steps of arranging the length of optical fibre in a groove of a single element open mould, the groove being shaped to enable the length of optical fibre to be lifted from the mould after application to said length of said reinstatement primary coating; placing a quantity of uncured liquid primary coating material in the groove such that the length of uncoated optical fibre is immersed in the primary coating material; curing the primary coating material to form said reinstatement primary coating; removing the length of optical fibre from the mould; and injection moulding the reinstatement secondary coating over the reinstatement primary coating such that the reinstatement secondary coating extends between the existing secondary coatings of said two portions.

2. A method as claimed in claim 1 including the step of heating the mould to cure the primary coating material placed in the groove.

3. A method as claimed in claim 1, wherein the existing primary coatings in said two portions have end regions adjacent to said length of optical fibre which are uncoated by said existing secondary coatings, and wherein said groove has a length sufficient to receive the end regions of said two portions and is sized such that the groove is closed off by the uncoated existing primary coatings of said two portions.

4. A method as claimed in claim 1, wherein said reinstatement primary coating has a non-uniform thickness about said optical fibre, and wherein said injection moulding comprises injection moulding using a two-part mould having a cavity with cross-sectional dimensions such that the reinstatement secondary coating and the existing secondary coatings are of substantially uniform dimensions.

* * * * *